(12) United States Patent
Robinette et al.

(10) Patent No.: US 8,631,918 B2
(45) Date of Patent: Jan. 21, 2014

(54) TORQUE TRANSMISSION ASSEMBLY WITH CLUTCHES

(75) Inventors: Darrell Lee Robinette, Fenton, MI (US); Victor M. Roses, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 362 days.

(21) Appl. No.: 12/840,867

(22) Filed: Jul. 21, 2010

(65) Prior Publication Data

US 2012/0021869 A1    Jan. 26, 2012

(51) Int. Cl.
*F16H 45/02* (2006.01)
*F16D 21/06* (2006.01)
*F16D 25/10* (2006.01)

(52) U.S. Cl.
USPC ............... 192/3.26; 192/3.29; 192/48.611; 192/48.619

(58) Field of Classification Search
USPC ..................... 192/3.25, 3.26, 3.27
See application file for complete search history.

(56) References Cited

U.S. PATENT DOCUMENTS

| 3,747,436 | A  | * | 7/1973  | Hause ........................ 475/69 |
| 7,891,476 | B2 | * | 2/2011  | Iwasaki et al. ........... 192/85.25 |
| 8,235,191 | B2 | * | 8/2012  | Heeke ....................... 192/3.26 |
| 2004/0224818 | A1 | * | 11/2004 | Leising et al. ............. 477/77 |
| 2006/0237275 | A1 | * | 10/2006 | Fujita et al. ............... 192/3.29 |
| 2009/0229937 | A1 | * | 9/2009  | Heeke ....................... 192/3.25 |

* cited by examiner

*Primary Examiner* — David D Le
*Assistant Examiner* — Mark Manley

(57) ABSTRACT

A torque transmission assembly is disposed between a power source and a vehicle transmission and includes an annular housing, a pump member of a fluid coupling, a turbine member of the fluid coupling, a lockup clutch, a first shaft, a first selectable clutch, a second shaft, and a second selectable clutch. The turbine member opposes the pump member and the lockup clutch is selectively engaged between the pump member and the turbine member. The first selectable clutch is selectively engaged between the turbine member and the first shaft. The second selectable clutch is selectively engaged between the turbine member and the second shaft.

17 Claims, 6 Drawing Sheets

TORQUE TRANSMISSION ASSEMBLY WITH CLUTCHES

TECHNICAL FIELD

The present disclosure relates to torque transmission assemblies, and more particularly to torque transmission assemblies that include torque converters and a plurality of clutches.

BACKGROUND

The statements in this section merely provide background information related to the present disclosure and may or may not constitute prior art.

Automatic transmissions provide a plurality of forward and reverse speeds or gear ratios by selectively actuating one or more brakes or clutches. Dual clutch transmissions have two input shafts that each provide a subset of the available gear ratios. Each of the two input shafts is selectively coupled to an engine by use of a clutch. Typical clutches are high slip capacity friction launch devices included inside the transmission housing or separately from the transmission. These high slip capacity friction launch devices may have disadvantageous performance characteristics, such as poor torsional isolation between the engine and the transmission, driveline induced shudder, poor drivability metrics at launch due to low engine torque, shudder from rotary stick-slip of the friction devices during vehicle launch, and poor thermal dissipation characteristics. In addition, these high slip capacity friction launch devices may require high content friction material and lubricating oil with superior friction properties. Thus, there is a need for a new and improved torque transmission assembly that provides beneficial operating modes to improve vehicle launch characteristics while avoiding disadvantageous characteristics.

SUMMARY

A torque transmission assembly is disposed between a power source and a vehicle transmission and includes an annular housing, a pump member of a fluid coupling, a turbine member of the fluid coupling, a lockup clutch, a first shaft, a first selectable clutch, a second shaft, and a second selectable clutch. The turbine member opposes the pump member and the lockup clutch is selectively engaged between the pump member and the turbine member. The first selectable clutch is selectively engaged between the turbine member and the first shaft. The second selectable clutch is selectively engaged between the turbine member and the second shaft.

In another example of the present invention, the housing defines a cavity and the turbine member, the lockup clutch, at least a portion of the first shaft, at least a portion of the second shaft, the first selectable clutch, and the second selectable clutch are each disposed in the cavity.

In yet another example of the present invention, the first shaft is a first input shaft of a vehicle transmission and the second shaft is a second input shaft of the vehicle transmission.

In yet another example of the present invention, the torque transmission assembly further includes a stator member, a one-way clutch, and a stationary shaft. The one-way clutch is connected between the stator member and the stationary shaft, and wherein the stator member is disposed between the pump member and the turbine member.

In yet another example of the present invention, the torque transmission assembly further includes a first fluid circuit, a second fluid circuit, and a third fluid circuit. The first fluid circuit is in hydraulic communication with an actuation member of the first selectable clutch, the second fluid circuit is in hydraulic communication with an actuation member of the second selectable clutch, and the third fluid circuit is in hydraulic communication with an actuation member of the lockup clutch.

In yet another example of the present invention, the first shaft defines a bore that is in fluid communication with a hydraulic fluid source.

In yet another example of the present invention, the first selectable clutch and the second selectable clutch are multi-plate clutches that include a plurality of first friction elements that are rotatably coupled with the turbine member and are interleaved with a plurality of second friction elements that are rotatably coupled with one of the first shaft and the second shaft.

In yet another example of the present invention, the first shaft and the second shaft are concentric.

In yet another example of the present invention, the lockup clutch includes a spring isolator.

Further features, aspects and advantages of the present invention will become apparent by reference to the following description and appended drawings wherein like reference numbers refer to the same component, element or feature.

BRIEF DESCRIPTION OF THE DRAWINGS

The drawings described herein are for illustration purposes only and are not intended to limit the scope of the present disclosure in any way.

DESCRIPTION

Figure 1:
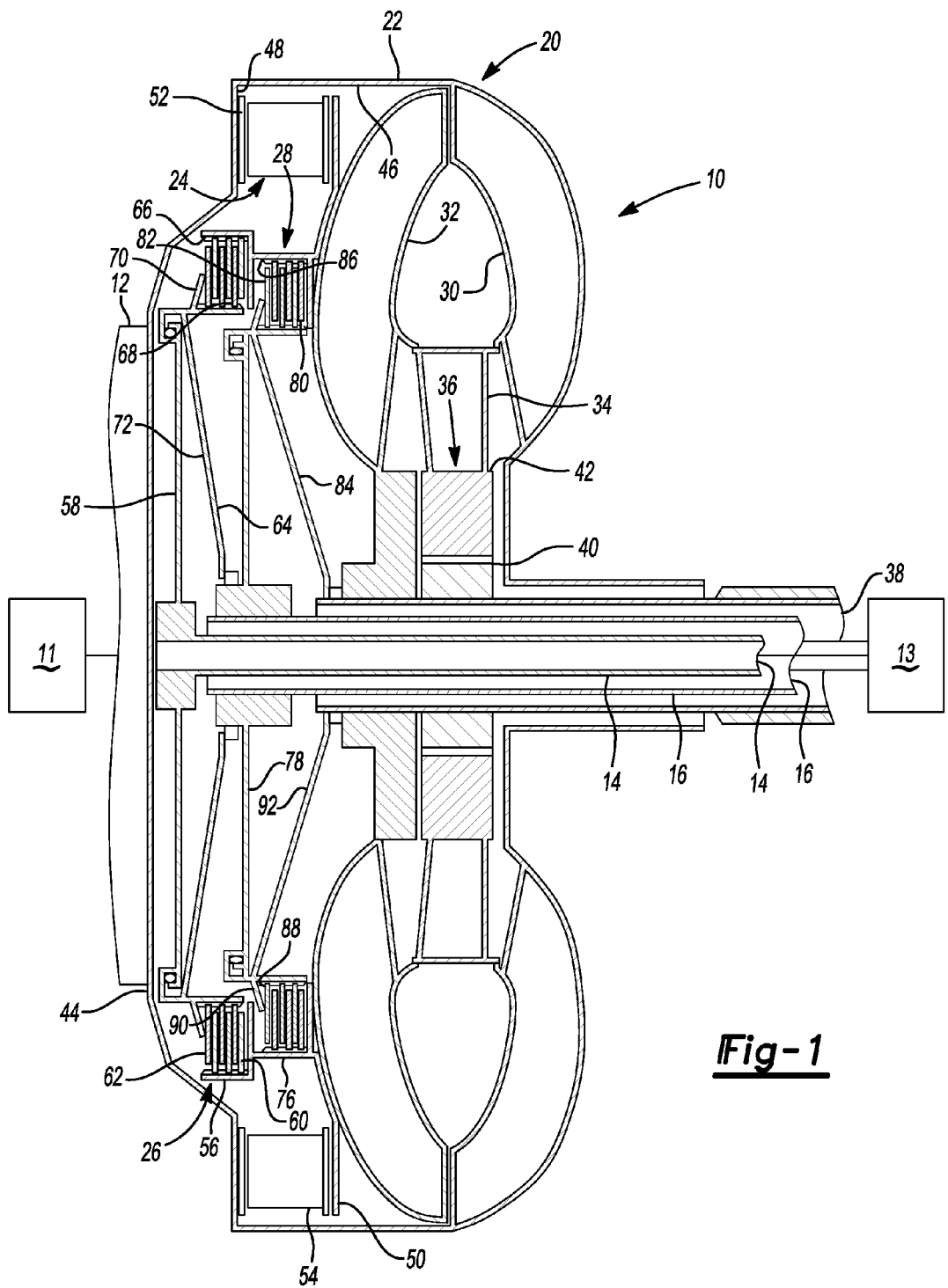
FIG. 1 is a schematic diagram of a torque transmission assembly according to an embodiment of the present invention.

Referring to the drawings, wherein like reference numbers refer to like components, in FIG. 1 a schematic diagram view of a torque transmission assembly 10 is illustrated in accordance with an embodiment of the present invention. The torque transmission assembly 10 is disposed in a vehicle between a power source or prime mover 11 and a transmission 13. The prime mover 11 is, for example, an engine or motor and is operable to provide output torque to a rotatable output shaft 12. It should be appreciated that other types of prime movers may be used without departing from the scope of the present invention. The transmission 13 generally includes a first transmission input shaft 14 concentric with a second transmission input shaft 16 that transfer torque to a plurality of gear sets, a plurality of shafts, and a plurality of torque transmitting mechanisms to provide a plurality of speed or gear ratios. It should be appreciated that the input shafts 14, 16 as illustrated may alternatively be considered output shafts of the torque transmission assembly 10 and may be separate shafts rotatably coupled to the transmission input shafts. The plurality of shafts may include layshafts or countershafts, sleeve and center shafts, reverse or idle shafts, or combinations thereof. It should be appreciated that the specific arrangement and number of the gear sets and the specific arrangement and number of the shafts within the transmission 13 may vary without departing from the scope of the present disclosure.

The torque transmission assembly 10 includes a torque converter 20, a housing 22, a lockup clutch 24, a first transmission input clutch 26, and a second transmission input clutch 28. The torque converter 20 includes a pump 30 and a turbine 32. The pump 30 is generally annular in shape and includes a plurality of fins (not shown) oriented to transfer rotational energy from the pump 30 to a hydraulic fluid (not shown) disposed within the housing 22, as will be described below. The turbine 32 is generally annular in shape and includes a plurality of fins (not shown) that oppose the pump 30 and are oriented to transfer rotational energy from the hydraulic fluid (not shown) to the turbine 32, as will be described below. It should be appreciated that the shape of the pump 30 and the turbine 32 may vary in length, width, and other dimensions based on design considerations. For example, in an alternative embodiment the pump 30 and the turbine 32 are shaped as a high round torus.

In the example provided the torque converter 20 is a torque converter that generally includes a stator 34 rotatably coupled through a one-way clutch 36 to a stationary shaft 38. The stator 34 includes a plurality of angled fins (not shown) extending radially and circumferentially from a center of the stator 34 to redirect hydraulic fluid that exits the turbine 32. The angled fins may be either stationary or adjustable. The one-way clutch 36 includes a first race 40 rotatably coupled to the stationary shaft 38 and a second race 42 rotatably coupled to the stator 34. The one-way clutch 36 allows rotation of the stator 34 in the rotational direction of the pump 30 and resists rotation of the stator 34 in the rotational direction opposite the rotational direction of the pump 30. In the example provided the stationary shaft 38 is coupled to a stationary component in the transmission. In alternative embodiments the torque transmission device 10 is a fluid coupling device and does not include the stator 34, the one-way clutch 36, the stationary shaft 38, the first race 40, or the second race 42.

The housing 22 is an annular component that is rotatably coupled with the pump 30. The housing 22 extends away from the pump 30 in an axial direction and has a substantially disc shaped end wall 44. The housing 22 and the end wall 44 define a cavity 46 for enclosing the hydraulic fluid and the clutches 24, 26, 28. A clutch surface 48 is disposed on an interior portion of the housing 22 for engagement with the lockup clutch 24. In the example provided the clutch surface 48 is disposed on a wall that is perpendicular to an axis defined by the torque converter 20 and opposes the turbine 32. In the example provided the housing 22 has two pieces and is bolted to the rotatable shaft 12 of the prime mover 11. It should be appreciated that the housing 22, however, may be any number of pieces and may be rotatably coupled to the rotatable shaft 12 in any suitable manner.

Figure 2:
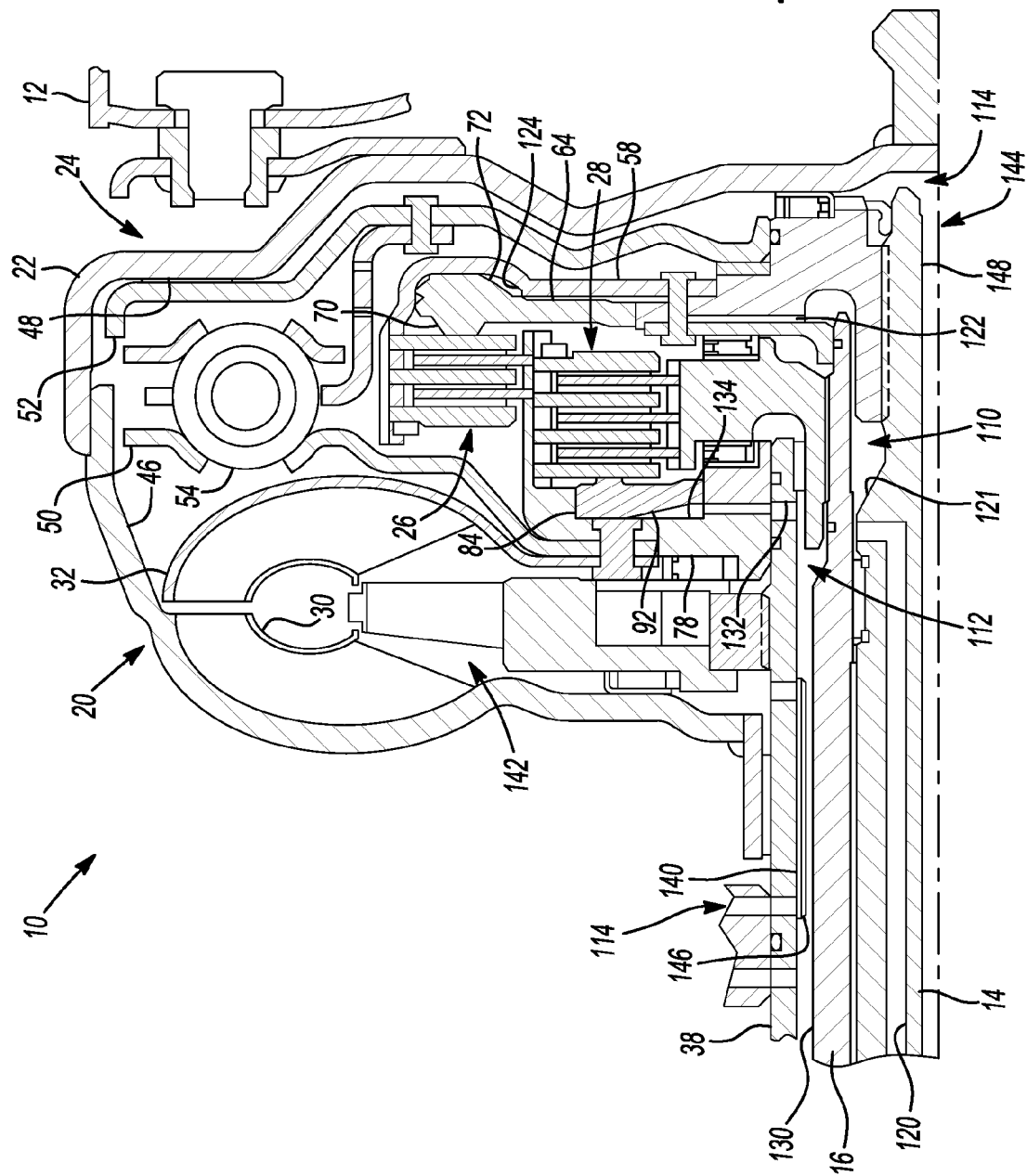
FIG. 2 is a cross section of an exemplary torque transmission assembly according to the an embodiment of the present invention.

The lockup clutch 24 is disposed between the turbine 32 and the clutch surface 48 of the housing 22. The lockup clutch 24 includes a first member 50 and a second member 52. The first member 50 is rotatably coupled with the turbine 32 and the second member 52 opposes the clutch surface 48 of the housing 22. In the example provided the lockup clutch 24 includes a spring isolator having a plurality of circumferentially spaced springs 54, as can be seen in FIG. 2. The springs 54 have a first end that engages the first member 50 and a second end that engages the second member 52. The springs 54 transmit all torque that passes through the lockup clutch 24 between the pump 30 and the turbine 32 to reduce torque spikes and vibration transmitted to the transmission. It should be appreciated that the springs 54 may be arranged in any suitable manner to vary the characteristics of the lockup clutch 24. For example, in an alternative embodiment the springs are arranged in a series spring configuration. In another alternative embodiment the lockup clutch 24 includes a dual-mass flywheel.

In the example provided, the transmission input clutches 26, 28 are closed piston multi plate clutches. The first input clutch 26 includes a first member 56, a second member 58, a plurality of first friction elements 60, a plurality of second friction elements 62, and an actuation member 64. The first member 56 is annular in shape and is rotatably coupled with the turbine 32. A plurality of splines 66 are axially aligned and circumferentially spaced on a surface of the first member 56. The second member 58 is annular in shape and is rotatably coupled with the first input shaft 14. A plurality of splines 68 oppose the splines 66 of the first member 56 and are axially aligned and circumferentially spaced on a surface of the second member 58.

The first friction elements 60 are ring shaped discs that are rotatably coupled with the splines 66 of the first member 56 of the clutch 26. The second friction elements 62 are rings that are axially interleaved with the first friction elements 60 and are rotatably coupled with the splines 68 of the second member 58. The actuation member 64 is a piston disposed in a cylinder defined by the second member 58 and includes an actuation portion 70 and an inner surface 72 that opposes the second member 58. The inner surface 72 is acted on by a hydraulic fluid to engage the first input clutch 26, as will be described in detail below.

The second input clutch 28 includes a first member 76, a second member 78, a plurality of first friction elements 80, a plurality of second friction elements 82, and an actuation member 84. The first member 76 is annular in shape and is rotatably coupled with the turbine 32. A plurality of splines 86 are axially aligned and circumferentially spaced on a surface of the first member 76. The second member 78 is annular in shape and is rotatably coupled with the second input shaft 16. A plurality of splines 88 oppose the splines 86 of the first member 76 and are axially aligned and circumferentially spaced on a surface of the second member 78.

The first friction elements 80 are ring shaped discs that are rotatably coupled with the splines 86 of the first member 76 of the clutch 26. The second friction elements 82 are rings that are axially interleaved with the first friction elements 80 and are rotatably coupled with the splines 88 of the second member 78. The actuation member 84 is a piston disposed in a cylinder defined by the second member 78 and includes an actuation portion 90 and an inner surface 92 that opposes the second member 78. The inner surface 92 is acted on by a hydraulic fluid to engage the second input clutch 28, as will be described in detail below.

Referring now to FIG. 2, wherein like numbers refer to like components, a cross sectional view of a torque converter according to the present invention is indicated by the reference number 10. FIG. 2 includes additional detail regarding how specific elements may be arranged in the torque transmission assembly as well as detail regarding actuation of the clutches 24, 26, 28. The clutches 24, 26, 28 are actuated by a hydraulic fluid in one of a first hydraulic circuit 110, a second hydraulic circuit 112, and a third hydraulic circuit 114. The first hydraulic circuit 110 communicates hydraulic fluid from a pressure source (not shown) to actuate the first input clutch 26. In the example provided the pressure source is a valve body of the transmission that separately pressurizes the hydraulic circuits 110, 112, 114. The first hydraulic circuit 110 includes a first fluid passage 120, a second fluid passage 121, a third fluid passage 122, and a fluid cavity 124. The first fluid passage 120 is a bore defined by the first transmission input shaft 14 and is in fluid communication with the pressure source. The first fluid passage 120 communicates the hydraulic fluid to a second fluid passage 121 defined between the first transmission input shaft 14 and the second transmission input shaft 16. The second fluid passage 121 communicates the hydraulic fluid to a third fluid passage 122 defined by the second member 58. The third fluid passage 122 is in fluid communication with the fluid cavity 124 defined between the second member 58 and the inner surface 72 of the actuation member 64.

The second hydraulic circuit 112 communicates hydraulic fluid from the pressure source to actuate the second input clutch 28. The second hydraulic circuit 112 includes a first fluid passage 130, a second fluid passage 132, and a fluid cavity 134. The first fluid passage 130 is defined between the second transmission input shaft 16 and the stationary shaft 38 and is in fluid communication with the pressure source. The second fluid passage 132 is in fluid communication with the first fluid passage 130 and is defined by the stationary shaft 38 and the turbine 32. The fluid cavity 134 is in fluid communication with the second fluid passage 132 and is defined between the second member 78 and the inner surface 92 of the actuation member 84.

The third hydraulic circuit 114 communicates hydraulic fluid through the cavity 46 of the pump 30 and selectively actuates the lockup clutch 24. The third hydraulic circuit 114 includes a first fluid passage 140, a fluid cavity 142, the cavity 46, and a second fluid passage 144. The first fluid passage 140 is in fluid communication with the pressure source and is defined by the stationary shaft 38 and an annular channel 146 attached to an inside surface of the stationary shaft 38. The fluid cavity 142 is defined between the pump 30 and the turbine 32 and is in fluid communication with the first fluid passage 140 and the cavity 46. The second fluid passage 144 is defined by an interior surface 148 of the first transmission input shaft 14 and is in fluid communication with the cavity 46 and the pressure source.

Figure 3:
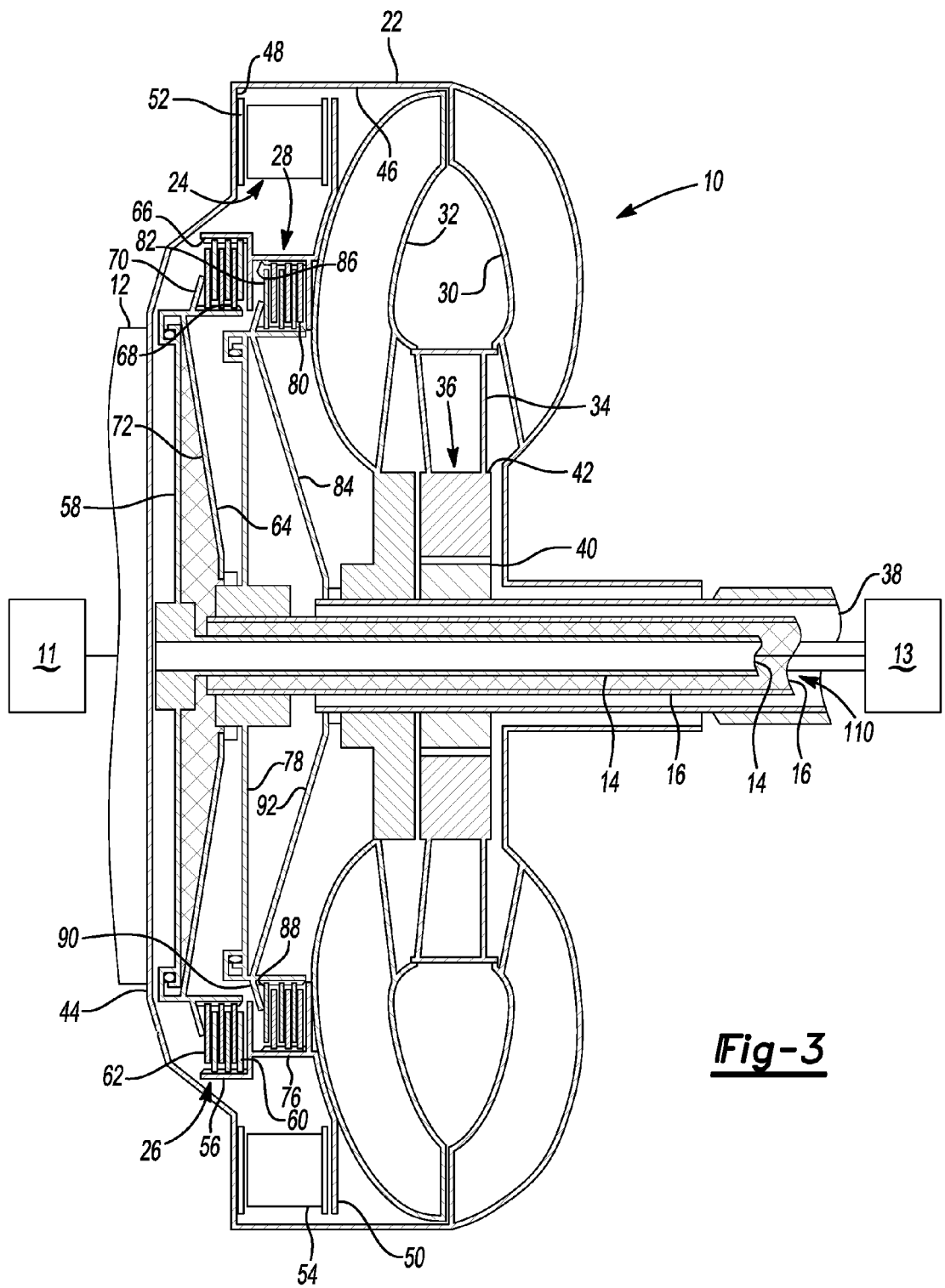
FIG. 3 is a schematic diagram of a hydraulic fluid flow through the torque transmission assembly in accordance with an embodiment of the present invention.

The operation of the torque transmission assembly will now be described with further reference to FIGS. 1 and 2. To actuate the first input clutch 26, as is shown schematically in FIG. 3, the pressure source provides hydraulic fluid to the first hydraulic circuit 110. The hydraulic fluid flows through the first fluid passage 120, through the second fluid passage 121, and through the third fluid passage 122 into the fluid cavity 124. The hydraulic fluid exerts a force on the inner surface 72 of the actuation member 64 to compress the second friction elements 62 against the first friction elements 60. Accordingly, torque transmits through the first member 56 to the splines 66, from the splines 66 to the first friction elements 60, from the first friction elements 60 to the second friction elements 62, from the second friction elements 62 to the splines 68 of the second member 58, and from the second member 58 to the first transmission input shaft 14.

Figure 4:
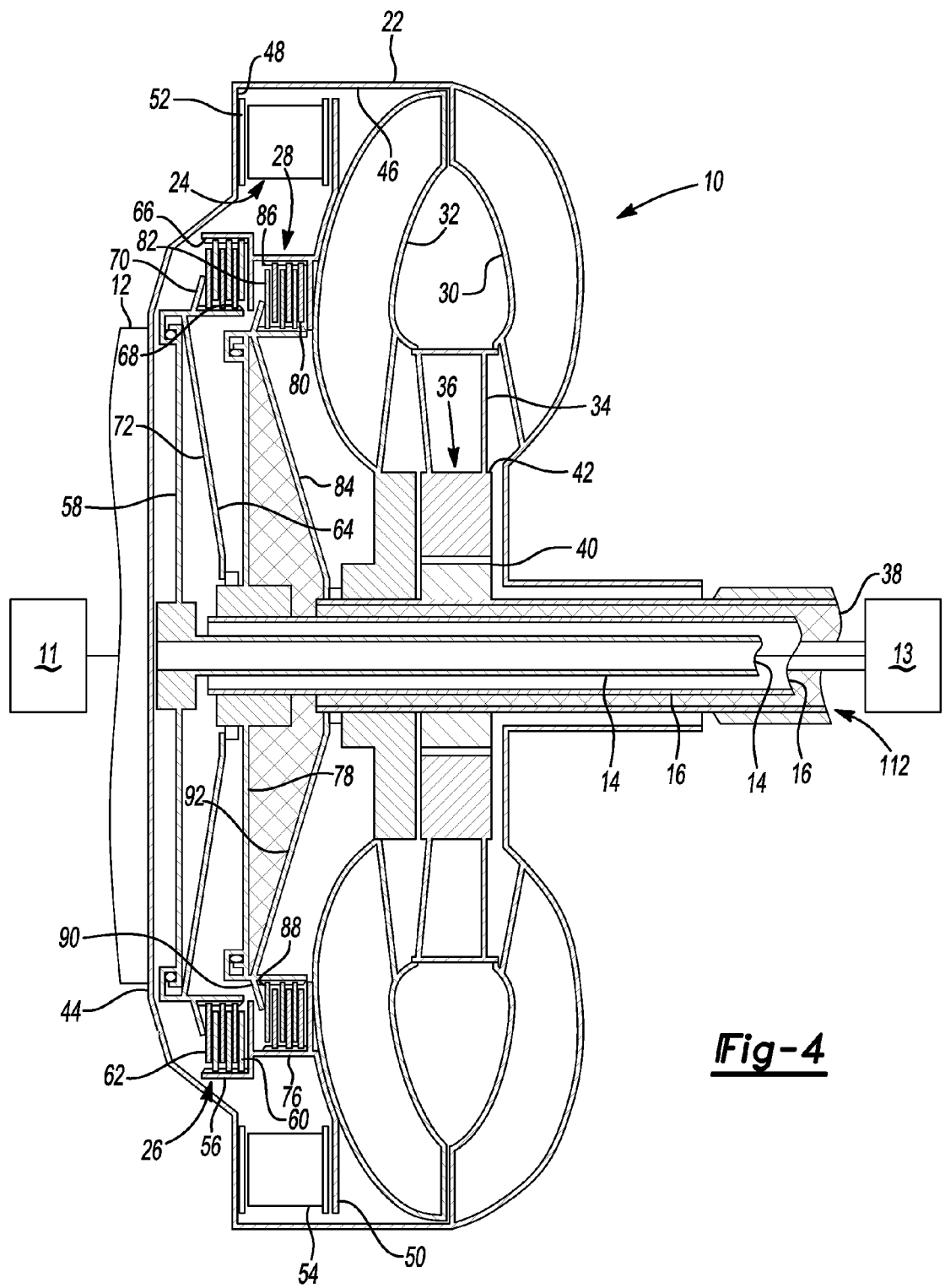
FIG. 4 is a schematic diagram of a hydraulic fluid flow through the torque transmission assembly in accordance with an embodiment of the present invention.

To actuate the second input clutch 28, as is shown schematically in FIG. 4, the pressure source provides hydraulic fluid to the second hydraulic circuit 112. The hydraulic fluid flows through the first fluid passage 130, through the second fluid passage 132, and into the fluid cavity 134. The hydraulic fluid exerts a force on the inner surface 92 of the actuation member 84 to compress the second friction elements 82 against the first friction elements 80. Accordingly, torque transmits through the first member 76 to the splines 86, from the splines 86 to the first friction elements 80, from the first friction elements 80 to the second friction elements 82, from the second friction elements 82 to the splines 88 of the second member 78, and from the second member 78 to the second transmission input shaft 16.

Figure 5:
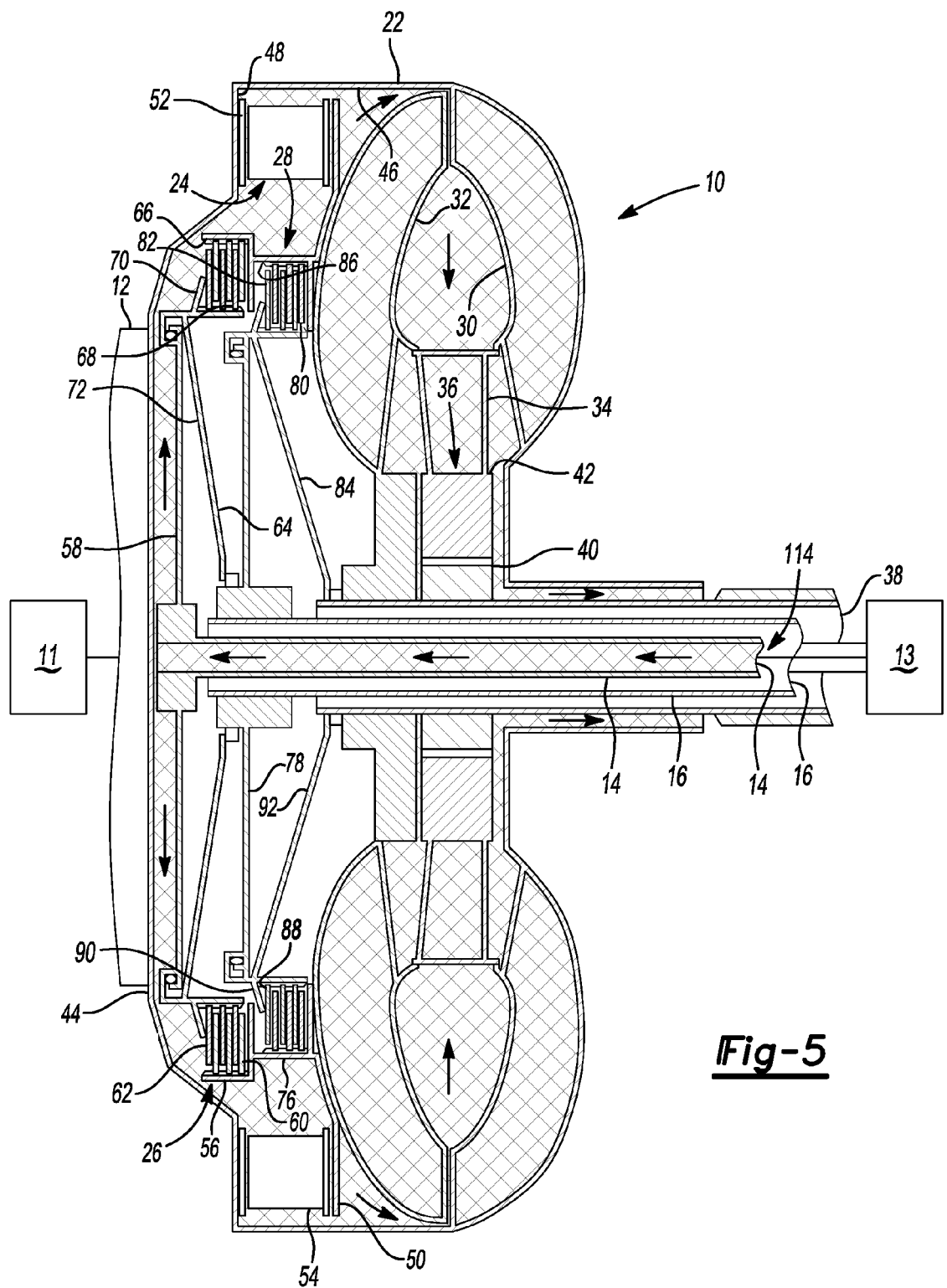
FIG. 5 is a schematic diagram of a hydraulic fluid flow through the torque transmission assembly in accordance with an embodiment of the present invention.

To operate the torque transmission assembly without the lockup clutch 24 actuated, as is shown schematically in FIG. 5, the pressure source provides hydraulic fluid to the second fluid passage 144 of the third hydraulic circuit 114. The hydraulic fluid flows through the cavity 46, releases the lockup clutch 24, and flows into the fluid cavity 142 between the pump 30 and the turbine 32.

Figure 6:
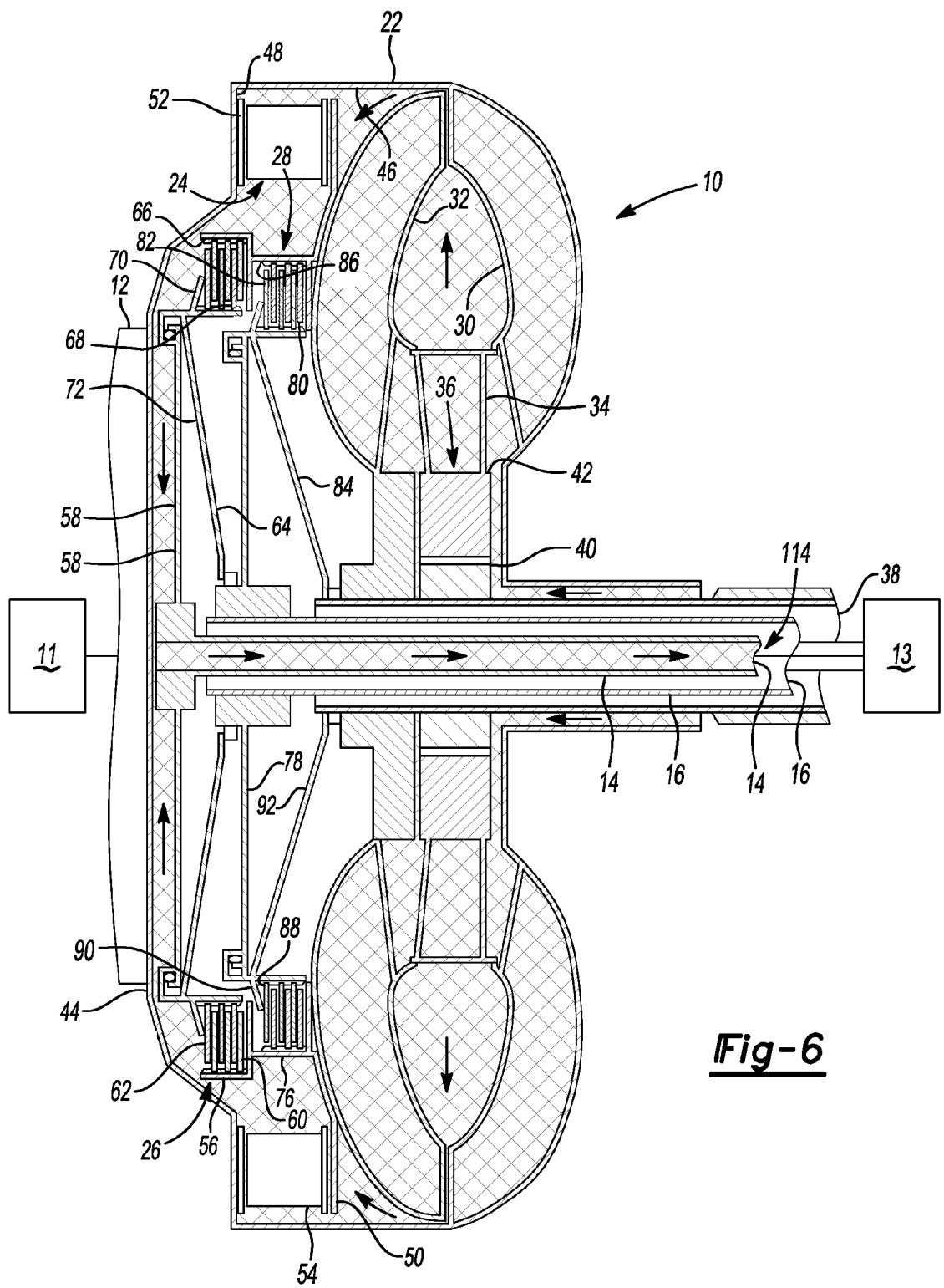
FIG. 6 is a schematic diagram of a hydraulic fluid flow through the torque transmission assembly in accordance with an embodiment of the present invention.

To actuate the lockup clutch 24, as is shown schematically in FIG. 6, the pressure source provides hydraulic fluid to the first fluid passage 140 of the third hydraulic circuit 114. The hydraulic fluid flows through the fluid cavity 142 and into the cavity 46. The hydraulic fluid urges the second member 52 of the lockup clutch 24 to engage the clutch surface 48 of the housing 22 and transmit torque between the pump 30 and the turbine 32. In the example provided, some hydraulic fluid flows through and around second member 52 and through the second fluid passage 144 to assist with cooling the torque transmission assembly. The lockup clutch 24 can be applied either fully locked by applying a high pressure to the third hydraulic circuit 114 or with a finite amount of slip by applying a lower pressure to the third hydraulic circuit 114. During light throttle launch scenarios the lockup clutch 24 can be applied with some finite slip to increase efficiency by transferring prime mover torque using both the lockup clutch 24 and the torque converter 20. Shifting of the input clutches 26, 28 may be performed with the lockup clutch 24 released, applied, or applied with a finite amount of slip.

Several operating modes are available for transferring torque between the rotatable shaft 12 and the input shafts 14, 16. Torque transfer may be accomplished by combinations of actuation and partial actuation of an input clutch 26, 28 and the lockup clutch 24. For example, in one operating mode useful to meet high torque demands one of the input clutches 26, 28 is fully actuated and the lockup clutch 24 is not actuated. In another operating mode useful for improving energy transfer efficiency at high speeds, one of the input clutches 26, 28 and the lockup clutch 24 are both actuated.

When no torque transfer through the torque transmission assembly is desired, such as when the vehicle is in Neutral or Park operating mode, the clutches 24, 26, 28 are disengaged. The pump 30 transfers energy to the hydraulic fluid, which then transfers energy to the turbine 32. The turbine 32 spins freely with respect to the first transmission input shaft 14 and the second transmission input shaft 16. Additionally, the lockup clutch 24 and one of the input clutches 26, 28 may be actuated by a low pressure to allow a finite slip to vary performance of the torque transmission assembly.

The present invention provides several beneficial operating modes and beneficial attributes. For example, enhanced vehicle launch performance is provided by means of torque multiplication through a torque converter as well as smooth launch feel by a high degree of torsional decoupling between engine and rotating components of the transmission and vehicle driveline. Additionally, the invention may provide fuel consumption benefits from the relatively low amount of pressurized hydraulic fluid supplied to the torque converter and an ability to provide transmission input decoupling at vehicle idle. The hardware components and quality properties associated with the hydraulic fluid may also be less stringent than is desirable for previous high slip capacity friction launch devices. The torque converter with stator may also provide beneficial high torque capability for use during, for example, towing and hauling operations.

The description of the invention is merely exemplary in nature and variations that do not depart from the general essence of the invention are intended to be within the scope of the invention. Such variations are not to be regarded as a departure from the spirit and scope of the invention.

We claim the following:

1. A torque transmission assembly disposed between a power source and a vehicle transmission, the torque transmission assembly comprising:
   a rotatable annular housing adapted to be driven by a prime mover;
   a fluid coupling having a pump member coupled to said annular housing for rotation therewith and a turbine member;
   the turbine member of the fluid coupling disposed in the annular housing and opposing the pump member;
   a lockup clutch disposed between the annular housing and the turbine member;
   a first shaft;
   a first selectable clutch disposed within the rotatable annular housing, axially adjacent the turbine member and selectively engaged between the turbine member and the first shaft;
   a second shaft; and
   a second selectable clutch disposed within the rotatable annular housing, coupled to the turbine member and selectively engaged between the turbine member and the second shaft.

2. The torque transmission assembly of claim 1, wherein the rotatable annular housing defines a cavity, and wherein the turbine member, the lockup clutch, at least a portion of the first shaft, at least a portion of the second shaft, the first selectable clutch, and the second selectable clutch are each disposed in the cavity of the rotatable annular housing.

3. The torque transmission assembly of claim 2, wherein the first shaft is a first input shaft of a vehicle transmission and the second shaft is a second input shaft of the vehicle transmission.

4. The torque transmission assembly of claim 1 further including a stator member, a one-way clutch, and a stationary shaft, wherein the one-way clutch is connected between the stator member and the stationary shaft, and wherein the stator member is disposed between the pump member and the turbine member.

5. The torque transmission assembly of claim 1 further including a first fluid circuit, a second fluid circuit, and a third fluid circuit, wherein the first fluid circuit is in hydraulic communication with an actuation member of the first selectable clutch, the second fluid circuit is in hydraulic communication with an actuation member of the second selectable clutch, and the third fluid circuit is in hydraulic communication with an actuation member of the lockup clutch.

6. The torque transmission assembly of claim 5, wherein the first shaft defines a bore that is in fluid communication with a hydraulic fluid source.

7. The torque transmission assembly of claim 1, wherein the first selectable clutch and the second selectable clutch are multi-plate clutches that include a plurality of first friction elements that are rotatably coupled with the turbine member and are interleaved with a plurality of second friction elements that are rotatably coupled with one of the first shaft and the second shaft.

8. The torque transmission assembly of claim 1, wherein the first shaft and the second shaft are concentric.

9. The torque transmission assembly of claim 1, wherein the lockup clutch includes a spring isolator.

10. A vehicle power train comprising:
   a rotatable shaft coupled to a prime mover;
   a rotatable torque transmission assembly housing that defines a cavity and is coupled to said rotatable shaft;
   a fluid coupling having a pump member and a turbine member, wherein the pump member is rotatably coupled to the rotatable shaft through said assembly housing;
   the turbine member of the fluid coupling disposed within the rotatable assembly housing and opposing the pump member;
   a lockup clutch disposed and selectively engaged between the rotatable assembly housing and the turbine member, the lockup clutch including an actuation member;
   a first shaft that is disposed at least partially outside of the cavity;
   a first selectable clutch disposed within the cavity of the assembly housing, axially adjacent the turbine member and selectively engaged between the turbine member and the first shaft, the first selectable clutch including an actuation member;
   a second shaft that is disposed at least partially outside of the cavity;
   a second selectable clutch disposed within the cavity of the assembly housing, coupled to the turbine member and selectively engaged between the turbine member and the second shaft, the second selectable clutch including an actuation member;
   a first fluid circuit in hydraulic communication with the actuation member of the first selectable clutch;
   a second fluid circuit in hydraulic communication with the actuation member of the second selectable clutch; and
   a third fluid circuit in hydraulic communication with the actuation member of the lockup clutch.

11. The torque transmission assembly of claim 10, wherein the turbine member, at least a portion of the input member, the lockup clutch, at least a portion of the first shaft, and at least a portion of the second shaft are each disposed in the cavity of the housing.

12. The torque transmission assembly of claim 11, wherein the assembly housing is hydraulically sealed.

13. The torque transmission assembly of claim 10 further including a stator member, a one-way clutch, and a stationary shaft, wherein the one-way clutch is connected between the stator member and the stationary shaft, and wherein the stator member is disposed between the pump member and the turbine member.

14. The torque transmission assembly of claim 10, wherein the first shaft defines a bore that is in fluid communication with a hydraulic fluid source.

15. The torque transmission assembly of claim 10, wherein the first selectable clutch and the second selectable clutch are multi-plate clutches that include a plurality of first friction elements that are rotatably coupled with the turbine member and are interleaved with a plurality of second friction elements that are rotatably coupled with one of the first shaft and the second shaft.

16. The torque transmission assembly of claim 10, wherein the first shaft and the second shaft are concentric.

17. The torque transmission assembly of claim 10, wherein the lockup clutch includes a spring isolator.

\* \* \* \* \*